United States Patent [19]
Kreider

[11] 3,756,355
[45] Sept. 4, 1973

[54] ELECTRIC BRAKE CONSTRUCTION

[75] Inventor: Carl R. Kreider, Goshen, Ind.

[73] Assignee: Dexter Axle Company, Inc., Elkhart, Ind.

[22] Filed: May 25, 1972

[21] Appl. No.: 256,937

[52] U.S. Cl. .............................................. 188/138
[51] Int. Cl. ...................... B60t 13/74, H02k 7/102
[58] Field of Search...................... 188/138; 310/76, 310/77

[56] References Cited
UNITED STATES PATENTS
3,244,259   4/1966   Brede et al. ........................ 188/138
3,668,445   6/1972   Grove ............................ 188/138 X

*Primary Examiner*—Duane A. Reger
*Attorney*—Peter P. Price et al.

[57] ABSTRACT

The electro-magnet which is attracted to and which frictionally engages the armature to actuate the brake includes a central opening to permit mounting and retention of the electro-magnet on a tab projecting toward the armature from one end of the brake actuating lever. A generally donut-shaped retaining ring locks the electro-magnet to the tab and provides a universally pivotal mount for the magnet at a point close to the plane at which the magnet engages the armature face, for transfer of force from magnet to lever arm at such point. The retaining ring includes a nipple projecting from the inner surface of the ring opening to mate with an indent formed in a corresponding surface of the tab. The ring is stiffly resiliently expandable to permit the ring to be positioned over the tab, but expansion of the ring for removal is prevented when it is seated in the central opening of the electro-magnet, both by the stiffness of the resilient ring and by the walls of the opening, which confine the ring and act as a barrier.

19 Claims, 8 Drawing Figures

3,756,355

PATENTED SEP 4 1973

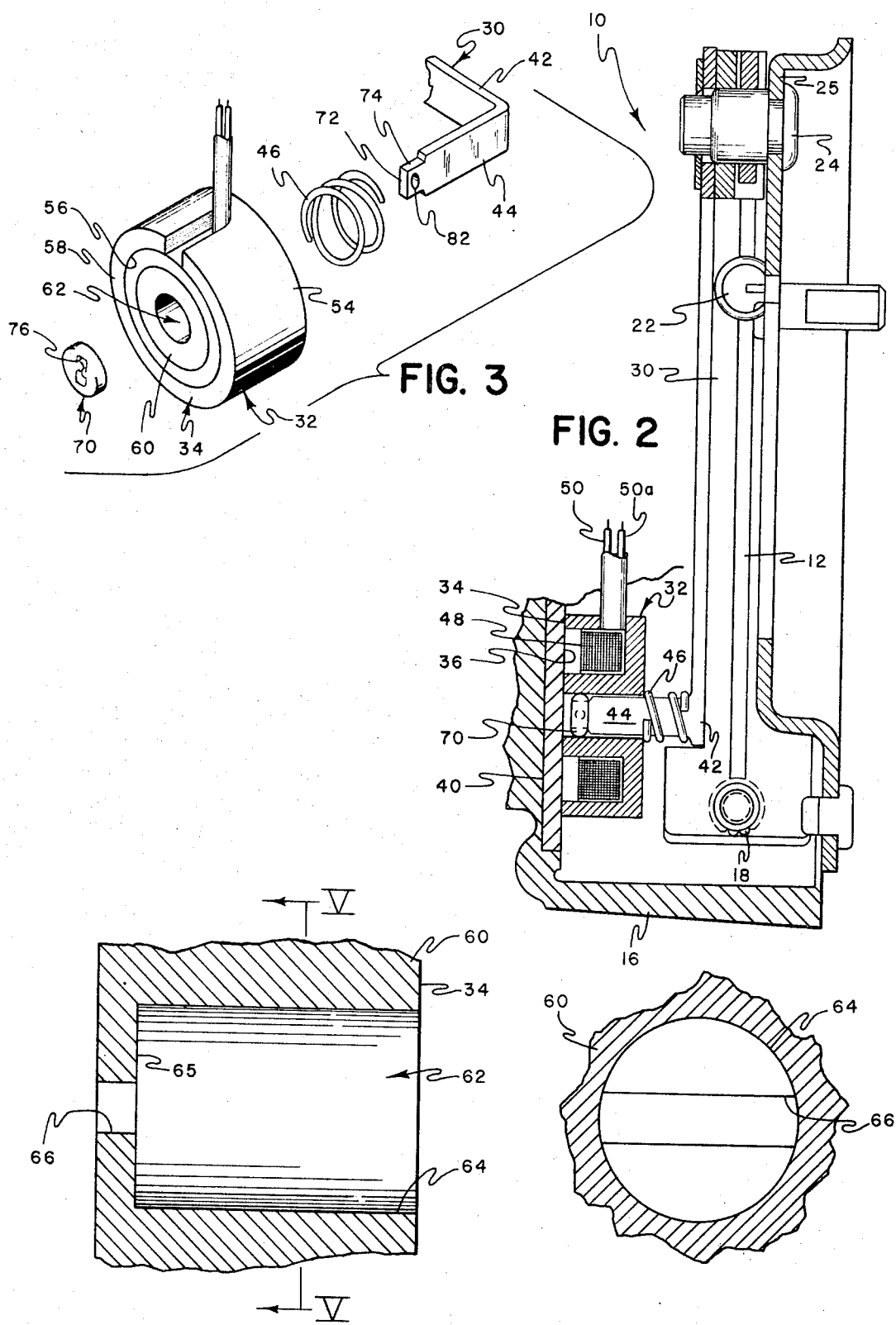

ELECTRIC BRAKE CONSTRUCTION

BACKGROUND OF THE INVENTION

This invention relates to an electric brake construction and more particularly to means for mounting an electro-magnet on the brake actuating lever.

Known electric brakes utilize an electro-magnet which when energized is attracted toward, and rides against, a flat-faced rotating armature. The electro-magnet is supported on a movable lever arm and, when energized and attracted to the moving armature, tends to move with the latter as a result of the magnetic attraction and, jointly, by the frictional interplay. This force is transmitted to the lever arm to pivot or rotate the same at least somewhat, and thus actuates the brake shoes into braking engagement with a brake drum.

As a practical matter, armatures do not always rotate in a truly flat plane, as a result of unavoidable clearances, end play, and other factors such as inaccuracies in tolerancing of the armature face and rotating drum. Thus, armatures often tend to oscillate slightly in the axial direction in actual operation. This causes the establishment of unequal pressures and hence moments which tend to tip or cant the electro-magnet. The presence of unequal pressures also causes localized high pressure and high temperature areas which not only affect the overall efficiency of operation of the brake, but also shorten the service life of the brake through uneven wear.

Another disadvantage of the known prior art is the overall complexity required in mounting the electro-magnet to the lever. Utilization of mechanical fasteners requires extra labor in the fabrication and hence increases the overall cost.

While certain elements of the prior art are directed to overcoming these advantages, none have been entirely successful. Thus, there is a need in this art for an improved electro-magnet mounting arrangement in an electric brake which is both simple to assemble at the time of manufacture, and which increases the efficiency and service life of the brake.

SUMMARY OF THE INVENTION

A conventional electric brake includes an electro-magnet supported on a movable lever arm and urged toward a rotating armature into operative association therewith. Energization of the electro-magnet causes it to magnetically couple with, and frictionally engage, the armature thereby urging the magnet to move at least a brief distance jointly with the armature. This applies a like movement to the lever arm, which actuates the brake shoes into braking engagement with the brake drum.

In accordance with the invention, the lever arm includes a tab portion at one end extending toward the armature. A resilient retaining ring having a generally annular or donut shape fits snugly over the tab. The tab or the ring includes projecting means receivable by an indent on the other member. The electro-magnet has an opening of varying configuration for receiving both the tab and ring. The tab-receiving portion of the opening permits a certain degree of universal movement of the magnet relative to the tab to follow any irregularities of armature movement. The tab is inserted through the electro-magnet so that the ring can be stretched over the tab until the projection seats in the indent. Release of the electro-magnet causes it to be urged toward the armature with the retaining ring being received in the magnet opening. This prevents removal of the ring and retains the magnet while permitting the latter to float within limits about the tab.

A significant advantage of the invention is the overall simplicity in assembly of the electro-magnet to the lever arm. The elimination of the necessity of inserting or manipulating mechanical fasteners such as screws or pins significantly reduces the labor involved when the mass-production aspects of assembly are taken into account. Another significant advantage is the universal movement and floatation permitted by the mounting mechanism so that the electro-magnet can follow any irregular movements of the armature to continuously maintain the desired flat face-to-face contact relationship between the electro-magnet and armature and, at the same time, to couple the force from the magnet to the lever arm at a point close to the magnet and armature interface. This significantly improves brake torque and reduces wear, while also increasing the operating effectiveness of the brake by maximizing the effective magnetic force between armature and magnet.

DESCRIPTION OF THE DRAWINGS

FIG. 2 is a fragmentary cross-sectional view taken generally through the plane II—II of FIG. 1;

FIG. 3 is an exploded fragmentary perspective view of the electro-magnet and lever arm of the invention;

FIG. 4 is an enlarged fragmentary cross-sectional view of the tab-receiving opening in the electro-magnet;

FIG. 5 is a sectional elevation through the plane V—V of FIG. 4;

DESCRIPTION OF THE PREFERRED EMBODIMENT

Figure 1:
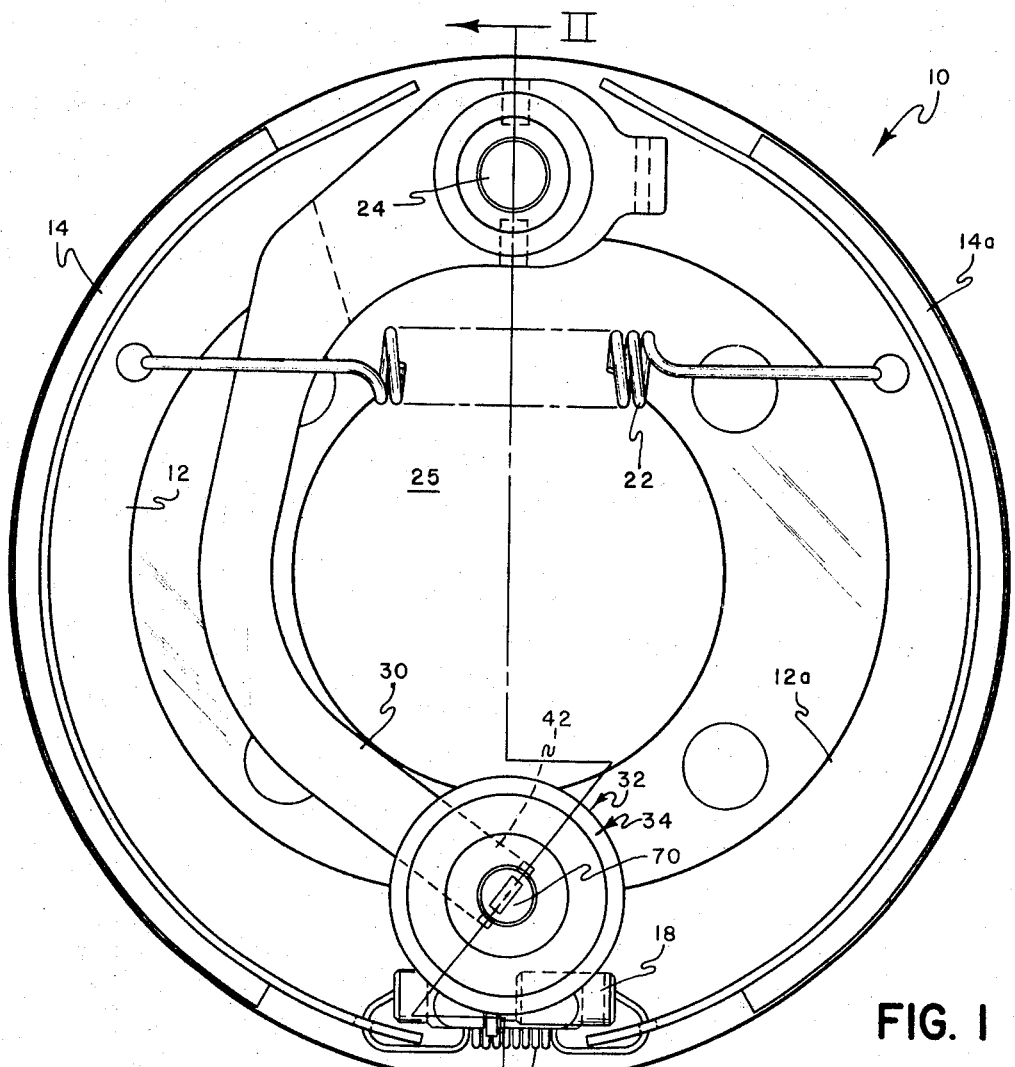
FIG. 1 is a side elevation view of an electric brake construction showing an electro-magnet and lever arm assembled in accordance with the invention.

Referring briefly to FIGS. 1 and 2 of the drawings, an electric brake generally designated by the reference numeral 10 is shown comprising in the conventional sense a pair of brake shoes 12, 12a and linings 14, 14a movable into braking engagement with the brake drum 16 (FIG. 2). The brake shoes 12, 12a are articulated at their lower ends by a conventional adjusting screw mechanism and tensioning spring 20. The shoes are urged into a retracted or non-braking position by tension spring 22 which releases the brake upon removal of an actuating force.

The upper ends of shoes 12, and 12a conventionally bear pivotally against an anchor pin 24 about which one or both shoes may rotate. The pin is anchored to the braking plate 25. At least one of the shoes is normally actuated by a lever arm 30 rotatable about pin 24 to move a shoe and lining into braking engagement with the drum. This causes each shoe to rotate electrically thereby causing braking engagement with the drum by the other shoe. A detailed description of actual braking operation is not necessary herein since the actuation of shoes 12, 12a by lever arm 30 may for purposes of this invention be considered as being conventional. A preferred arrangement of the lever, brake shoe and anchor pin is described and claimed in U.S. Pat. application, Ser. No. 225,393, entitled ELECTRIC BRAKE, filed Feb. 11, 1972, and having a common assignee to the present application.

The lower end of lever arm 30 is interconnected to an electro-magnet 32 which has a friction face 34 adapted to engage the friction face 36 of an armature 40 (FIG. 2). Armature 40 is shown integral with the drum itself although it can also be a separate disc or plate member secured to the latter. It is comprised of a suitable magnetic material and rotates jointly with the drum about the drum axis.

The lower end 42 of lever arm 30 terminates in a tab 44 (FIGS. 2 and 3) which projects towards armature 40 and armature face 36. Electro-magnet 32 includes an opening 62 for receiving tab 44. The length of tab 44 exceeds that of opening 62 for reasons which will be clarified hereinafter. When mounted on tab 44, electro-magnet 32 is urged by a spring 46 into a preferably light pressure engagement with armature 40 so that friction faces 34 and 36 are in flat abutment with each other. Electro-magnet 32 includes a plurality of windings 48 energized by a conventional power source (not shown) through lead wires 50 and 50a. When the electro-magnet is energized, it is magnetically attracted to the relatively moving armature 40, and due to the friction between these two elements so attracted, a force is imposed on the magnet tending to move it in the direction of movement of the armature. This force is in turn transmitted by lever arm 30 to actuate brake shoes 12, 12a into braking engagment with drum 16. It is the unique and novel way in which electro-magnet 32 is mounted to tab 44 that forms the subject of the present invention.

Electro-magnet 32 is a sub-assembly comprising an outer annular housing 54 (FIG. 3) having an annular recess 56 in friction face 34. Recess 56 divides housing 54 into annular outer and inner poles 58 and 60. In addition, recess 56 receives windings 48 which form the magnet coil assembly. The electro-magnet 32 (FIGS. 3 and 4) includes an opening 62 through its geometric center which extends perpendicular to friction face 34. Tab 44 is received in opening 62 and transmits the force generated by the sliding movement of the magnet with respect to the armature through lever arm 30 to brake shoes 12, 12a as input energy.

Opening 62 preferably changes cross-section from a circular cross-sectional portion 64 at the side of the friction face 34 to a rectangular cross-sectional portion 66 (FIGS. 4 and 5) at the rear of the magnet. The circular or round portion 64 of opening 62 basically corresponds dimensionally to, but is slightly larger than, the outer diameter of a donut-shaped retaining ring 70 which fits over the outer end of tab 44 and forms a snap fit therewith to anchor electro-magnet 32 to tab 44. Round opening portion 64 is sized so that the retainer ring 70 can slide within this opening but cannot spread enough to release itself from the snap engagement with the outer end of tab 44. The snap-fit arrangement will be described in more detail hereinafter.

The rectangular portion 66 of opening 62 generally corresponds dimensionally to the narrower section of rectangular tab 44. Rectangular portion 66 is sized small enough to prevent rotation of electro-magnet 32 on the tab although there is a finite clearance between tab 44 and rectangular opening portion 66, sufficient to permit freedom of installation as well as a limited degree of universally pivoted movement of electromagnet 32 about tab 44, so that the magnet may pivot on retaining ring 70, which acts as a spherical mount for the magnet at a point near the magnet-armature interface, as the magnet seeks continuous alignment with armature face 36. In other words, due to the irregularities of rotation or axial oscillation of armature 40, electro-magnet 32 is purposefully not secured rigidly to tab 44 so that it may constantly follow any irregularities in the movement of armature face 36, so that friction face 34 of electro-magnet 32 and friction 36 of armature 40 are in a constant flat abutting relationship. As noted earlier, electro-magnet 32 is constantly urged into a light pressure engagement with armature 40 by means of a coil spring 46 mounted on tab 44 intermediate the electro-magnet and lever arm. A shoulder 64 is formed at the transition between opening portions 64 and 66 of opening 62. Opening portion 66 is relatively narrow to match the shape of tab 44 while opening portion 64 corresponds to ring 70. Shoulder 65 prevents removal of electro-magnet 32 from tab 44 after ring 70 is mounted on the tab, as described hereinafter.

It is to be pointed out that while the relationship of the rectangular size and shape of the tab 44 and of the opening 66 in the electro-magnet discussed above is a very satisfactory way of preventing rotation of the magnet upon the tab while still allowing some relative movement therebetween, this specific relationship is not the only way of accomplishing these goals and to this extent should not be regarded as being of essence to the practice of the invention. Instead, it could be recognized that the novel magnet-retention means of the invention can readily be used with other structural arrangements which may provide similar operational characteristics.

Referring now to FIG. 3, lever arm 30 includes a tab 44 projecting from its lower end 42 perpendicular to friction face 36 of armature 40. The overall cross-sectional configuration of tab 44 is rectangular and the tab should be slightly smaller than rectangular opening 66 in electro-magnet 32, for receipt therethrough. The free end 72 of tab 44 has a reduced cross-sectional portion 74 which corresponds dimensionally to the cross section of opening 76 in retaining ring 70.

Figure 6:
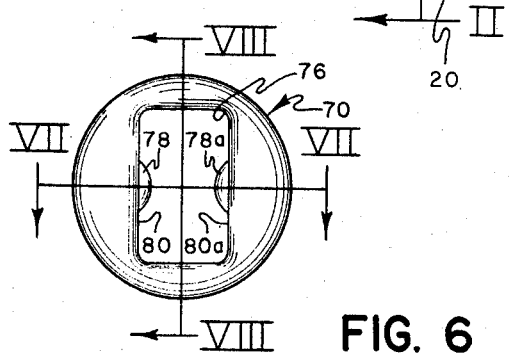
FIG. 6 is an enlarged side-elevational view of the retaining ring provided by invention.
Figure 8:
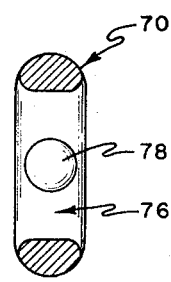
FIG. 8 is a cross-sectional view of the retaining ring shown in FIG. 6 taken along plane VIII—VIII.
Figure 7:
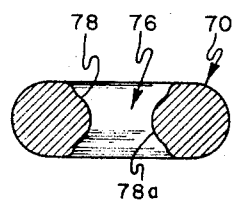
FIG. 7 is a cross-sectional view of the retaining ring shown in FIG. 6 taken along plane VII—VII.

Referring to FIGS. 6 - 8, ring 70 has an overall flattened spherical shape such as a donut, with an opening 76 in its center. Opening 76 has a rectangular cross section for receiving the free end 72 of tab 44. In addition, a pair of inwardly-projecting oppositely-facing nipples 78, 78a project from inner surfaces 80, 80a for receipt in appropriately sized indents 82 (FIG. 3) formed in the outer corresponding surfaces of reduced cross-sectional portion 74 of tab 44. Retaining ring 70 is preferably comprised of a relatively hard rubber or plastic material which has only sufficient resiliency to permit it to be stretched over the free end 72 of tab 44 with sufficient flexibility to permit clearance of nipples 78 and 78a. As soon as the nipples are received into indents 82, the retaining ring will snap into place and will stiffly but resiliently seat upon the tab. Ring 70 is preferably comprised of 30 percent glass-filled nylon, which provides an ideal composition rendering the preferred resilient characteristics of the ring.

ASSEMBLY

Having described the structural details and relationships of the various components of electric brake 10, the assembly or disassembly of electro-magnet 32 onto tab 44 should be obvious. Briefly, referring to FIG. 3, spring 46 is first inserted over tab 44, followed by electro-magnet 32. The length of tab 44 relative to the width or axial length of electro-magnet 32 is such to permit the extension of free end 72 and reduced cross-sectional portion 74 through the entire electro-magnet past friction face 34. Retaining ring 70 is then stretched over the reduced cross sectional portion 74 until nipples 78, 78a snap into indents 82. Electro-magnet 32 is then released for movement toward armature 40 as a result of spring 46, with retaining ring 76 being received with a relatively close fit within the round portion 64 of opening 62 (FIG. 2). Nonetheless, the ring when mounted upon the tab should be slideable inside the opening 62. The closeness of the fit of retaining ring 70 within opening 62 can serve as a positive barrier to prevent the retainer ring from spreading enough for nipples 78, 78a to leave indents 82; however, the stiff resiliency of the ring itself will normally prevent this since the ring grips the tab securely. Shoulder 65 formed at the transition of round portion 64 and rectangular portion 66 acts as a stop against retaining ring 70 to prevent removal of electro-magnet 32 from tab 44 unless it is urged back toward lever arm 30 to once more extend retaining ring 70 beyond the electro-magnet to permit its removal.

One significant aspect of the invention is the relative simplicity and ease with which the electro-magnet can be assembled or disassembled from the lever arm. In addition, the simplicity and cross-sectional configuration of tab 44 eliminates the need for costlier machining required by a number of the configurations of the prior art. At the assembly stage, there need not be any alignment procedure or pigeon holing of a fastener into the tab since retaining ring 70 is self-aligning as a result of the matching configuration of its opening 76 with the configuration of free end 72 of tab 44. The assembler simply slips the ring over the free end of the tab until it snaps into place when nipples 78, 78a spring or snap back into indents 82.

As noted in FIG. 4, the depth of rectangular portion 66 relative to round portion 64 of opening 62 in electro-magnet 32 permits relatively free oscillatory or universal movement of electro-magnet 32 about tab 44 and upon the spherically-shaped outer periphery of retaining ring 70, so that the magnet may follow any slight irregular movements of armature face 36. At the same time, electro-magnet 32 is positively prevented from rotating about the tab 44, is completely self-aligning upon the armature face 36, and is in effect mounted for force transfer through the mounting and retaining ring 70 to tab 44 (and thus to lever arm 30) at a point close to the magnet-armature interface, thereby maximizing the magnet's ability to generate actuating torque input for the brake which of course, increases brake output. At the same time the ability of the magnet to follow the armature freely and provide a flat interface between friction faces 34 and 36 provides more even magnet wear and hence improves the service life of the electro-magnet.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as may be specifically stated in the claims.

The embodiments of the invention in which an exclusive property or privilege is claimed are defined as follows:

1. In an electric brake mechanism of the type having an armature with a face rotatable about an axis; a brake actuating lever having a tab portion at one end extending toward said armature; an electro-magnet having means defining an opening therethrough for receipt of said tab; and means for mounting said electro-magnet to said lever and tab, the improvement comprising; means defining a retaining member having opposed side portions defining an opening for receiving said tab, to permit said member to be positioned over said tab; the cross section of said tab corresponding generally to the cross section of said member opening to provide contact between surfaces of said member and of the tab, at least one of the contacting surfaces of said tab and said member including an indent, another of said surfaces including means projecting therefrom for receipt in said indent, and at least portions of said member being resiliently deformable to permit said member to fit over the outer extremity of said tab and permit engagement of said projecting means into said indent to lock said member to said tab.

2. The improvement according to claim 1 wherein said electro-magnet defines an opening therein having a first portion corresponding generally in cross section to that of said tab to permit insertion of said tab through said opening and having a second portion corresponding generally to the shape of said member to permit insertion of said member into said second portion of said opening when said member is locked to said tab, the walls of said electro-magnet defining said second portion preventing the expansion of said member to prevent removal of the latter and of the electro-magnet from said tab.

3. The improvement according to claim 2 wherein the juncture between said first and second electro-magnet opening portions defines a shoulder which prevents removal of said electro-magnet from said tab when said retaining member is locked to said tab and received in said second opening, said means for biasing said electro-magnet urging said shoulder towards said retaining member.

4. The improvement according to claim 2 wherein said projecting means extends from at least one of said side portions of said retaining member, and said indent is formed in the surface of said tab.

5. The improvement according to claim 1, wherein said retaining member comprises a ring-shaped element.

6. The improvement according to claim 5, wherein said ring-shaped element has an outer periphery which has at least portions of at least partially circular configuration.

7. The improvement according to claim 6, wherein at least said portions of said outer periphery are of at least partially spherical configuration.

8. The improvement according to claim 5, wherein said ring-shaped element has an outer periphery which is arcuately curved in a plane passing generally along the axis of the element.

9. The improvement according to claim 8, wherein said electro-magnet opening has a portion for receiving said ring-shaped element and defining a housing about said curved outer periphery of said element, such housing and said element thereby forming a mount which is in the nature of a pivotal ball and socket.

10. The improvement according to claim 9, wherein said portion of said magnet opening is disposed closely adjacent said armature.

11. The improvement according to claim 5, wherein said tab has at least a first non-circular cross-section portion adjacent said lever and a second portion at its free end, said retaining member comprising a generally donut-shaped ring having a central opening generally corresponding in size to said second portion of said tab, said indent being formed in one of the surfaces of said second tab portion adjacent to the surface of said ring opening having said projecting means.

12. The improvement according to claim 11, wherein said ring opening and tab includes a plurality of projecting means and indents.

13. An electric brake construction comprising, in combination: a rotating armature face; an actuating lever arm operatively associated with a brake shoe and brake drum to set said brake against said drum, one end of said lever arm having a tab extending toward said armature and generally perpendicular to said armature face; an electro-magnet mounted on said tab, said electro-magnet having means defining an opening for receipt of said tab and having a friction face engageable with said armature face; spring means intermediate said lever arm and electro-magnet to urge the latter toward said armature; the length of said tab exceeding the axial thickness of said electro-magnet to permit said electro-magnet to be moved upon said tab against said spring enough so that the end portion of said tab extends through said electro-magnet; and means defining a magnet retaining ring slideable over said tab end portion and seatable thereon so that when said electro-magnet is released, said retaining ring is received in said electro-magnet opening to lock said electro-magnet to said tab.

14. The combination according to claim 13, wherein said electro-magnet opening includes a first portion corresponding to the cross-section of said tab to prevent substantial relative rotation of said electro-magnet about said tab and a second portion intermediate said armature and said first portion having an enlarged cross-section dissimilar to said first portion and corresponding dimensionally to said ring for receipt of same.

15. The combination according to claim 14, wherein the clearance between said first portion of said magnet opening and said tab is sufficient to permit sufficient, movement for said electro-magnet friction face to flatly abut said armature face even though the rotation of said armature face is slightly irregular.

16. The combination according to claim 14, wherein the free end of said tab has a reduced cross-section relative to the remainder of said tab, said free end corresponding dimensionally to the opening of said retaining ring, one of said ring opening surfaces and free end surfaces including means projecting therefrom and receivable by a corresponding shaped indent formed in the other of said surfaces, said ring being resiliently expandable to permit insertion of said ring over said tab free end, said projecting means snap fitting into said indent.

17. The combination according to claim 16, wherein the walls of said second portion of said electro-magnet opening when surrounding said ring means on said tab encompass the ring means sufficiently to prevent the necessary expansion of said ring required to separate said ring and electro-magnet from said tab.

18. The combination according to claim 17, wherein the cross-section of said tab and ring opening are non-circular.

19. The combination according to claim 18, wherein said ring opening includes at least two projecting means extending from dissimilar different surfaces, and said free end of said tab includes at least two indents formed in different surfaces disposed adjacent to said different surfaces of said ring openings.

* * * * *

UNITED STATES PATENT OFFICE
CERTIFICATE OF CORRECTION

Patent No. 3,756,355     Dated September 4, 1973

Inventor(s) Carl R. Kreider

It is certified that error appears in the above-identified patent and that said Letters Patent are hereby corrected as shown below:

Col. 1, line 37, "advantages" should read -- disadvantages --.

Col. 3, line 4, after "in" delete "U.S.".

Col. 3, line 59, after "that" delete "the".

Col. 6, line 13, after "axis" delete ";" and insert -- , --.

Signed and sealed this 25th day of June 1974.

(SEAL)
Attest:

EDWARD M. FLETCHER, JR.            C. MARSHALL DANN
Attesting Officer                  Commissioner of Patents